United States Patent
Barnes (10) Patent No.: US 6,756,117 B1
(45) Date of Patent: Jun. 29, 2004

(54) PHOTONIC POLYMER-BLEND STRUCTURES AND METHOD FOR MAKING

(75) Inventor: Michael D. Barnes, Oak Ridge, TN (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 44 days.

(21) Appl. No.: 10/325,112

(22) Filed: Dec. 20, 2002

(51) Int. Cl.$^7$ ................................................. B32B 5/16
(52) U.S. Cl. ............. 428/402; 428/402.21; 428/402.22; 428/402.24; 428/407; 427/212; 524/557; 524/803
(58) Field of Search ........................... 428/402, 402.21, 428/402.22, 402.24, 407; 427/212; 524/557, 803

(56) References Cited

U.S. PATENT DOCUMENTS

| | | | |
|---|---|---|---|
| 5,150,242 A | * 9/1992 | Fellows | 359/108 |
| 6,040,017 A | * 3/2000 | Mikhael et al. | 427/496 |
| 6,228,516 B1 | * 5/2001 | Denton et al. | 429/7 |
| 6,461,546 B1 | 10/2002 | Noid et al. | |
| 6,579,630 B2 | * 6/2003 | Li et al. | 428/690 |
| 6,599,631 B2 | * 7/2003 | Kambe et al. | 428/447 |
| 6,602,395 B1 | * 8/2003 | Zhuang et al. | 205/317 |
| 6,649,433 B2 | * 11/2003 | Mikhael et al. | 438/22 |

OTHER PUBLICATIONS

M.D. Barnes, et al., "Probing Phase–Separation Behavior in Polymer–Blend Microparticles: Effects of Particle Size and Polymer Mobility", Macromolecules, 1999, 32, pp. 7183–7189.

M.D. Barnes, et al., "Homogeneous Polymer Blend Microparticles with a Tunable Refractive Index", Optics Letters, Feb. 1, 1999, pp. 121–123, vol. 24, No. 3.

J.V. Ford, et al., "Polymer Microparticle Arrays From Electrodynamically Focused Microdroplet Streams", Review of Scientific Instruments, Jun. 2000, pp. 2497–2499, vol. 71, No. 6.

M. Bayer, et al., "Optical Modes in Photonic Molecules", Physical Review Letters, Sep. 21, 1998, pp. 2582–2585, vol. 81, No. 12.

* cited by examiner

Primary Examiner—Leszek Kiliman (57) ABSTRACT

The present invention comprises the formation of photonic polymer-blend structures having tunable optical and mechanical properties. The photonic polymer-blend structures comprise monomer units of spherical microparticles of a polymer-blend material wherein the spherical microparticles have surfaces partially merged with one another in a robust inter-particle bond having a tunable inter-particle separation or bond length sequentially attached in a desired and programmable architecture. The photonic polymer-blend structures of the present invention can be linked by several hundred individual particles sequentially linked to form complex three-dimensional structures or highly ordered two-dimensional arrays of 3D columns with 2D spacing.

16 Claims, 7 Drawing Sheets

PHOTONIC POLYMER-BLEND STRUCTURES AND METHOD FOR MAKING

Invention was made with government support under contract no. DE-AC05-00OR22725 awarded by the United States Department of Energy to UT-Battelle, LLC., and the government has certain rights in the invention.

FIELD OF THE INVENTION

The present invention relates to the field of nanostructured polymer-blend composite materials, particular photonic polymer-blend structures having tunable optical and mechanical properties.

BACKGROUND OF THE INVENTION

Nanostructured polymer-blend or polymer-inorganic composite materials are the subject of intense and widespread interest as researchers pursue next-generation "soft-material" species with tunable properties. In particular, there continues to be strong interest in the complex mechanics of viscoelastic systems, droplet coalescence, behavior of polymer blends in shear fields, as well as in electrospinning of polymer nanofibers. There is limited literature on fabrication of semiconductor structures with similar functionality. The lithographic fabrication techniques are expensive, time-consuming, and require specialized hardware and expertise. Further, cryogenic temperatures are required to observe the desired optical coupling between components in the composite structure. The understanding of the fundamental polymer physics of these systems is crucial to the development of advanced materials and processing techniques involving polymer blends at micro- and nanoscopic length scales. Furthermore, while there is a great deal of interest currently in the field of "microphotonics", or manipulation, both in spatial and frequency dimensions, of photons for electro-optic device enhancement, wavelength division multiplexing applications and optical computing, there exists few new device strategies for overcoming the difficulties of highly specific frequency response/transmission characteristics, and spatial localization at or near diffraction-limited resolution. Fiber-optic technology, for example, is widely used for "photon conduits" but is selective in terms of frequency transmission characteristics- all possible frequencies are transmitted through the fiber that are permitted by the optical material. In the case of photonics or photonic-bandgap structures, only specific frequencies are allowed to propagate. The photonic polymer-blend structures of the present invention are similar in that regard, but allow for a multiplicity of structural architectures that are not possible with conventional photonics bandgap crystals.

OBJECTS OF THE INVENTION

Accordingly, it is an object of the present invention to provide two- and three-dimensional photonic polymer-blend structures having a variety of architectures.

It is another object of the present invention to provide photonic polymer-blend structures having tunable optical and mechanical properties.

It is a further object of the present invention to provide photonic polymer-blend structures having desired architectures formed by the sequential attachment of polymer-blend spherical microparticles partially merged with one another in a robust inter-particle bond having tunable bond lengths.

Further and other objects of the present invention will become apparent from the description contained herein.

SUMMARY OF THE INVENTION

In accordance with one aspect of the present invention, the foregoing and other objects are achieved by a photonic polymer-blend structure having tunable optical and mechanical properties. The structure comprises monomer units of spherical microparticles of a polymer-blend material wherein the microparticles have surfaces partially merged with one another in a robust inter-particle bond having a tunable inter-particle separation. The polymer-blend spherical microparticles of the photonic polymer-blend structure are sequentially attached to one another in a desired and programmable architecture.

In accordance with another aspect of the present invention, other objects are achieved by a method for making photonic polymer-blend structures having tunable optical and mechanical properties. The method comprising the steps of a) providing an aqueous polymer-blend solution comprising a relative mass fraction of polyethylene glycol and polyvinyl alcohol wherein the solution has a sufficient water and polymer blend ratio to form polymer-blend spherical microparticles having specific properties and morphology to enable the microparticles to partially merge in a sequential attachment with one another to form an inter-particle bond wherein the specific properties and morphology of the microparticles tune the inter-particle separation of the inter-particle bond and wherein the specific properties and morphology of the spherical microparticles produce a desired photonic polymer-blend structure having a desired architecture. The method of the present invention further comprising b) injecting the aqueous polymer-blend solution into a particle focusing device at a sufficient rate to form individual droplets of solution; c) controlling the parameters of the particle focusing device to allow the droplets to be spatially focused and guided through the particle focusing device to form spherical microparticles partially merged in a sequential attachment in an inter-particle bond with one another and having a tuned inter-particle separation; and d) depositing the spherical microparticles in a precise placement on a collection device forming a desired architecture of the photonic polymer-blend structure.

For a better understanding of the present invention, together with other and further objects, advantages and capabilities thereof, reference is made to the following

DETAILED DESCRIPTION OF THE INVENTION

The present invention comprises the formation of three-dimensional linear or branched chains of polymer-blend microspheres generated from liquid droplets of solution where the modified surface structure of the polymer composite results in highly robust inter-particle bonds. The present invention is based on a combination of particle manipulation techniques and a unique material property of a polymer blend material that allows highly spherical and homogeneous polymer-blend microspheres to be linked or "merged" together in a programmable manner to form three-dimensional strings or ordered vertical columns from the sequential attachment of the individual blend particles. This capability allows individual particles to retain their identity to a certain extent while coupling efficiently to its nearest neighbors in a variety of architectures. Robust particle linkage occurs as semi-dry polymer blend particles come in contact where the polymer mobility is sufficient to overcome the surface energy barrier to partially merge. The robust interlocking nature of the inter-particle bond or linkage gives rise to strongly coupled morphology-dependent resonances in bisphere and trisphere systems. These photonic molecules are mesoscopic heirachical structures constructed from monomer units with typical dimensions ranging from 1–10 $\mu$m that function as coupled optical resonators. The monomer units are sufficiently homogeneous and spherical to support optical resonances that, owing to the large solid angle of intersection and size uniformity, are strongly coupled between particles. These structures are labeled as photonic molecules because they confine electromagnetic fields in modes that are closely analogous to bonding and anti-bonding electronic molecular orbitals in real molecules. The long-term stability and structural integrity of these species provides for interesting applications in three-dimensional conductive vertical wires/supports, sensor technologies, or microphotonics.

Figure 1A:
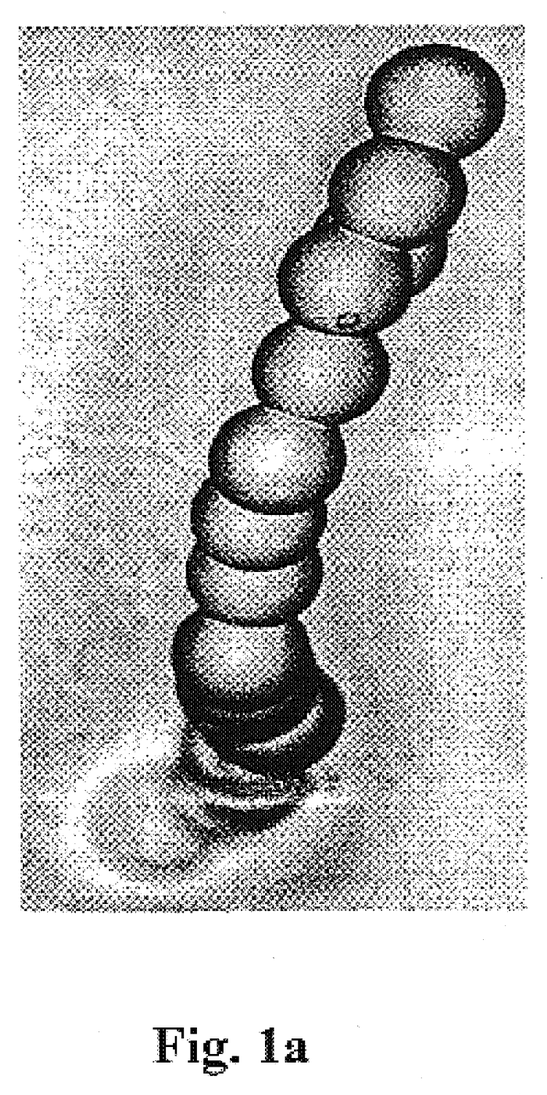
FIG. 1a shows an electron micrograph of a photonic polymer structure of about 30 individual spheres in the vertical chain that has folded near the top.
Figure 1B:
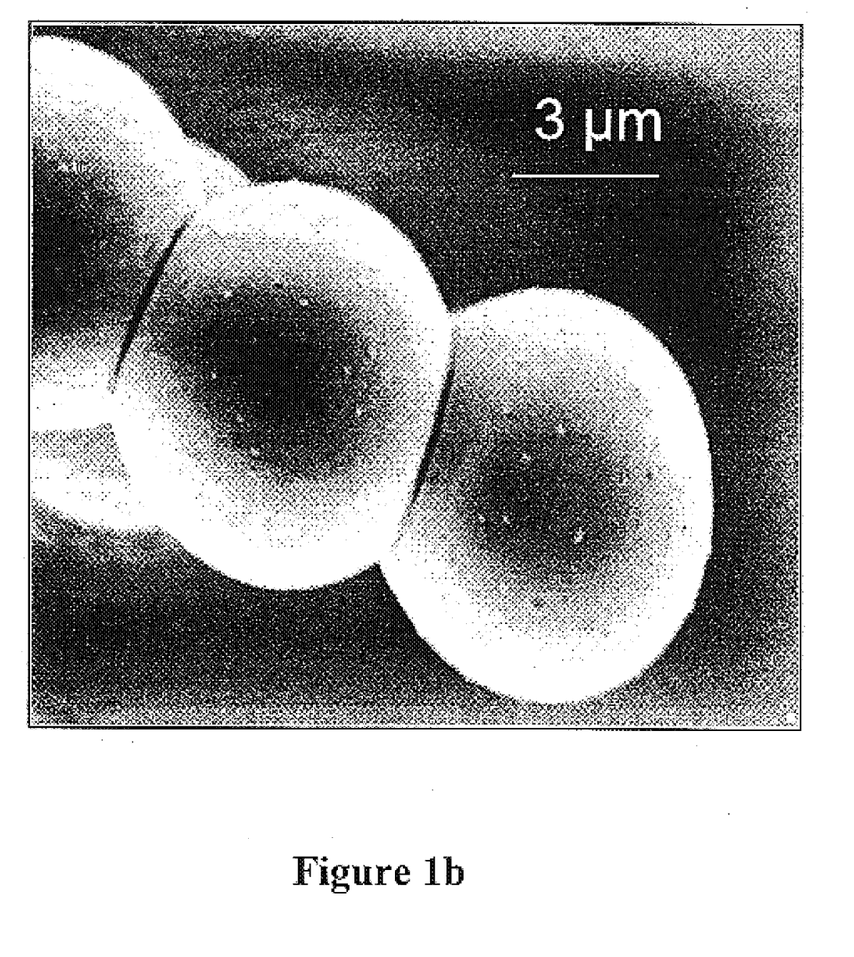
FIG. 1b shows an electron micrograph of a close-up of the "bonding" between particles.

The key to the present invention was in the discovery of an interesting material property of a simple water-soluble polymer-blend system that allowed construction of this new kind of polymer microsphere-based structure referred to as photonic polymer molecules. It was discovered in the course of screening different water-soluble polymer blends for high-density ordered microsphere array applications, that particles made from polyethylene glycol (PEG) (~10k MW) and polyvinyl alcohol (PVA) (~14k MW) in a 4:1 mass ratio had a tendency to stick together in clumps of tivos, threes, or multiple particles. Under higher magnification, it was observed that the "sticking" was in fact a partial merging of the particle surfaces as shown in FIG. 1a. The particle binding was so robust, that under high-p recision particle focusing conditions, particles were "stacked" in nearly perfect columnar structures up to ~20 particles high. FIG. 1a shows an electron micrograph of a photonic polymer structure of about 30 individual spheres in the vertical chain that has folded near the top. FIG. 1b shows a close-up of the particle linkage and illustrates clearly that the contact between particles is not like that of physisorbed spheres; the surfaces are merged with a solid angle of intersection of 0.2 to 1.2 steradians depending on the blend composition and residual water content. Other types of two- and three-dimensional architectures were explored using an electric quadrupole and computer-controlled 2-D translation stage for particle positioning. In contrast with string formation in polymer-blend emulsions under a shear force or chain-of-pearl agglomeration in rotating shear fields where large aspect ratio structures are confined to a plane, these stable three-dimensional structures were "grown" from sequential attachment of spherical polymer-blend microparticles. The method of the subject invention allows for precise and programmable architectures whose properties can be controlled by properties of the individual polymer-blend microparticles ("monomer" elements) such as size, charge-state, and position. Depending on the mode of operation, several hundred particles can be linked together to form complex three-dimensional structures, or highly ordered two-dimensional arrays of 3D columns can be produced with 2 D spacing as small as 30 $\mu$m. Some interesting applications of these columnar structures include doping the polymer particles with electrolytes to form conductive vertical wires that could interconnect various planar structures (see J. V. Ford et al., 2000, incorporated herein by reference). Recent molecular dynamics simulations also suggest that the whisker structures should have vibrational modes (or respond to low-frequency oscillating electric or magnetic fields) characteristic of the height of the stack and the diameter of the monomer particle which could lead to a new kind of acoustic sensor.

It has previously been shown that isolated polymer-blend micro- and nanoparticles generated from microdroplets of dilute solution provide an interesting format for probing polymer dynamics and blend properties in (three-dimensional) confined geometries (see Barnes et al., *Macromolecules*, 1999, incorporated herein by reference). In the limit of small droplet size (<10 $\mu$m diameter) where the time scale for solvent evaporation is much shorter than that of polymer diffusion and self-organization (concentration amplification), polymer-blend microparticles of bulk-immiscible polymers can be made homogeneous at length scales comparable to radii of gyration of single polymer molecules. Under these conditions, different optical or mechanical properties of the particle can be tuned by adjusting the weight fraction of the mixture, (Barnes et al., *Optics Letters*, 1999, incorporated herein by reference). Conversely, for larger droplets where phase separation can occur within the particle on the time scale of solvent evaporation, structural properties of multiphase particles can be explored either by fluorescence imaging or optical diffraction. However, the collective properties of ensembles of these species and how they might be exploited for larger scale applications is essentially unexplored.

In the present invention, different two- and three-dimensional structures were produced using a linear electric quadrupole as a particle focusing/positioning tool; however, other similar particle focusing devices can be used such as hollow-core optical fiber transmission techniques. The present invention is demonstrated in Example 1 below.

EXAMPLE 1

Figure 2:
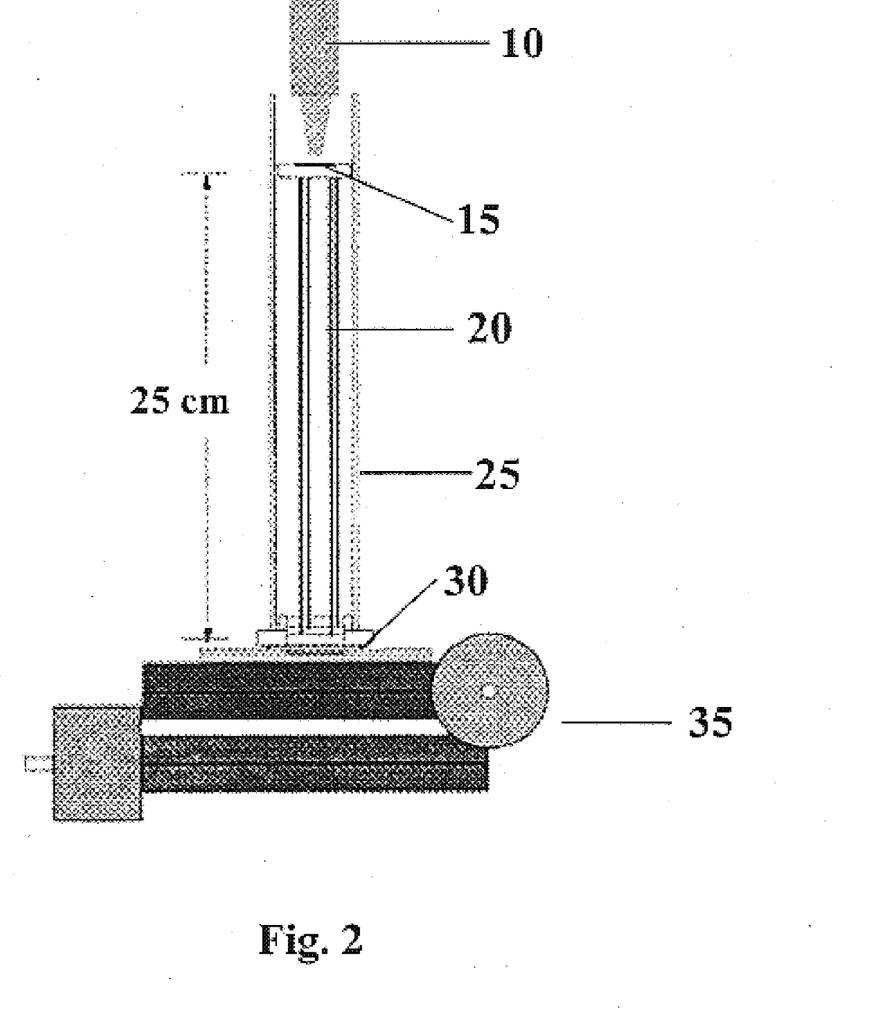
FIG. 2 is a schematic of an apparatus for generating polymer-blend photonic molecules and structures from electrodynamically focused microdroplet streams.

A dilute aqueous polymer solution of polyethylene glycol (10k MW) and polyvinyl alcohol (14k MW) in a 4:1 mass ratio was prepared then injected into a 25-cm-long quadrupole as monodispersed liquid droplets (25$\mu$m diameter) at a rate of between 2 and 5 Hz using a droplet generator driver coupled with a digital delay generator, an on-demand piezoelectric droplet generator (Stanford Research DG535). The quadrupole was driven at ~400 Hz, and 650 V. A combination of low-voltage function generator (Stanford Research DS335), a power amplifier (Kepco BOP 1000M), and 5 X step-up transformer were used to produce the focusing voltages. FIG. 2 is a schematic of the apparatus used surface to produce the polymer-blend photonic molecules of the present invention, wherein 10 is the on-demand piezoelectric droplet generator, charging ring (30 VDC) 15, the electric quadrupole focusing rods (300–600 VAC @ 60–800 Hz) 20, glass enclosure 25, teflon o-ring 30 and the computer-controlled X-Y translation stage 35 (Parker-Daedal Model 081–5987) with collection surface. The long rod configuration of the quadrupole was used to ensure that nearly all the solvent evaporated from the droplet en route to the microscope slide. The transit time from entry in the quadrupole to termination was about 45 sec. The computer-controlled X-Y translation stage, triggered by scattered light pulses generated near the termination of the quadrupole, allowed precise placement of particles on the collection surface. The quadrupole rods were terminated in a Macor ring, which, in turn, was seated in a grounded aluminum o-ring flange. This also provided a seal against the collection substrate as well as terminating the focusing field above the collection region. Particles were collected in a 3-mm field-free region on silanated glass slides (CEL Associates, Houston, Tex.) between the slide surface and the termination of the quadrupole mounted in a removable support under the quadrupole. The slides were mounted kinematically on the collection surface of the computer controlled X-Y translation stage. The computer-controlled X-Y translation stage was driven in discrete steps of 25–100 $\mu$m with 0.1 $\mu$m precision. The motion of the stage was synchronized with the droplet stream using a TTL-synch output from the droplet generator driver coupled with a digital delay generator.

Chemical treatment of the standard glass microscope slides was essential. Without pretreatment with a silanating agent, the particle positions were observed to be totally randomized, presumably due to the presence of stray charges on the surface of the glass. This problem was solved using a straightforward silanation procedure to chemically modify the surface of the slide. After cleaning in an ultrasonic bath, the slides were etched briefly (~60 sec) in buffered oxide etchant (BOE, a mixture of HF and $NH_4F$), and suspended above the vapor of a heated hexamethyl disilazane (HDSM) silanating agent (MicroPrime) for about 30 min.

Figure 3:
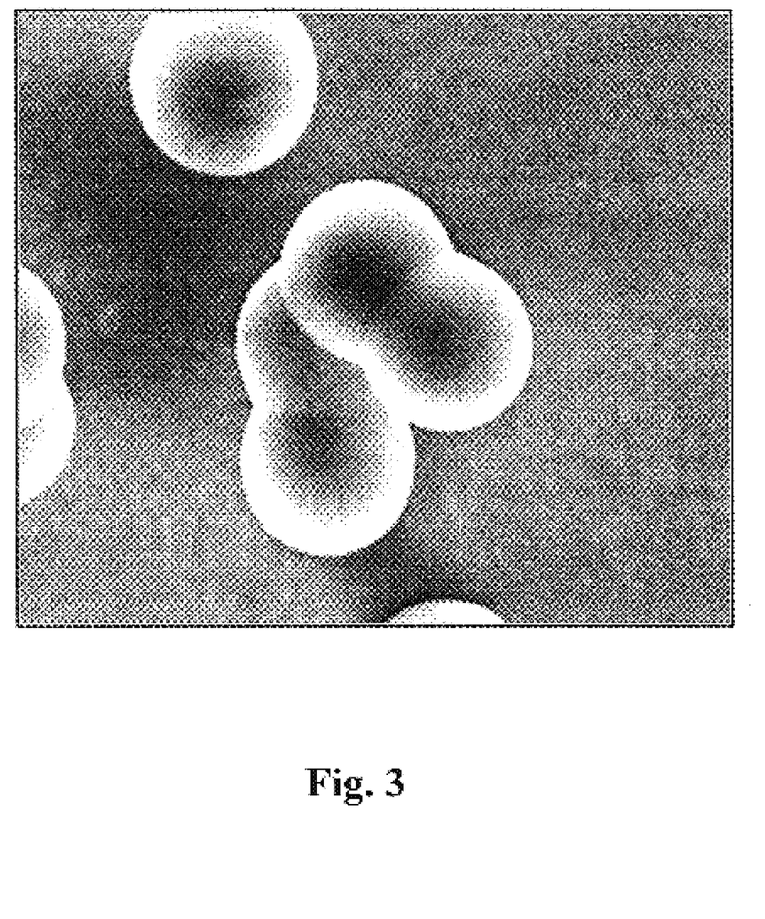
FIG. 3 shows an electron micrograph of a close-up of the inter-particle bonding when the relative PVA concentration is decreased and/or when the residual solvent fraction in the microparticles is increased.

The composition ratios of the starting aqueous polymer-blend solution to produce a desired photonic polymer structure is adjusted according to the amount of residual solvent (water) in the particle, and the relative amount of polyvinyl alcohol to polyethylene glycol within the particle as this ratio programs or "tunes" the inter-particle bond length also referred to as inter-particle separation. The particle to particle binding and the degree of surface interpenetration depends on several factors. For the surfaces of the two adjoining particles to merge, the surface energy barrier must be low enough for material to move across the particle boundary. In the case of the polymer superstructures of the present invention, the surface energy is defined by polymer chain mobility which is in turn related to 1) the amount of residual solvent (water) in the particle, and 2) the relative amount of PVA to PEG within the particle. The PVA adds structural rigidity at the expense of higher surface tension, so increasing the relative mass fraction of PVA results in smaller contact angles and a smaller shared volume of intersection, thus inhibiting particle attachment. This results in a shorter bond length or a shorter inter-particle separation. Conversely, decreasing the relative amount of PVA softens the particles, increases contact angles and larger shared volume of intersection; thus resulting in a deeper degree of surface interpenetration. FIG. 3 show an example of the inter-particle bonding when the relative PVA concentration is decreased and/or residual solvent fraction in the particle is increased (for instance, by increasing the relative humidity to slow evaporation).

Figure 4:
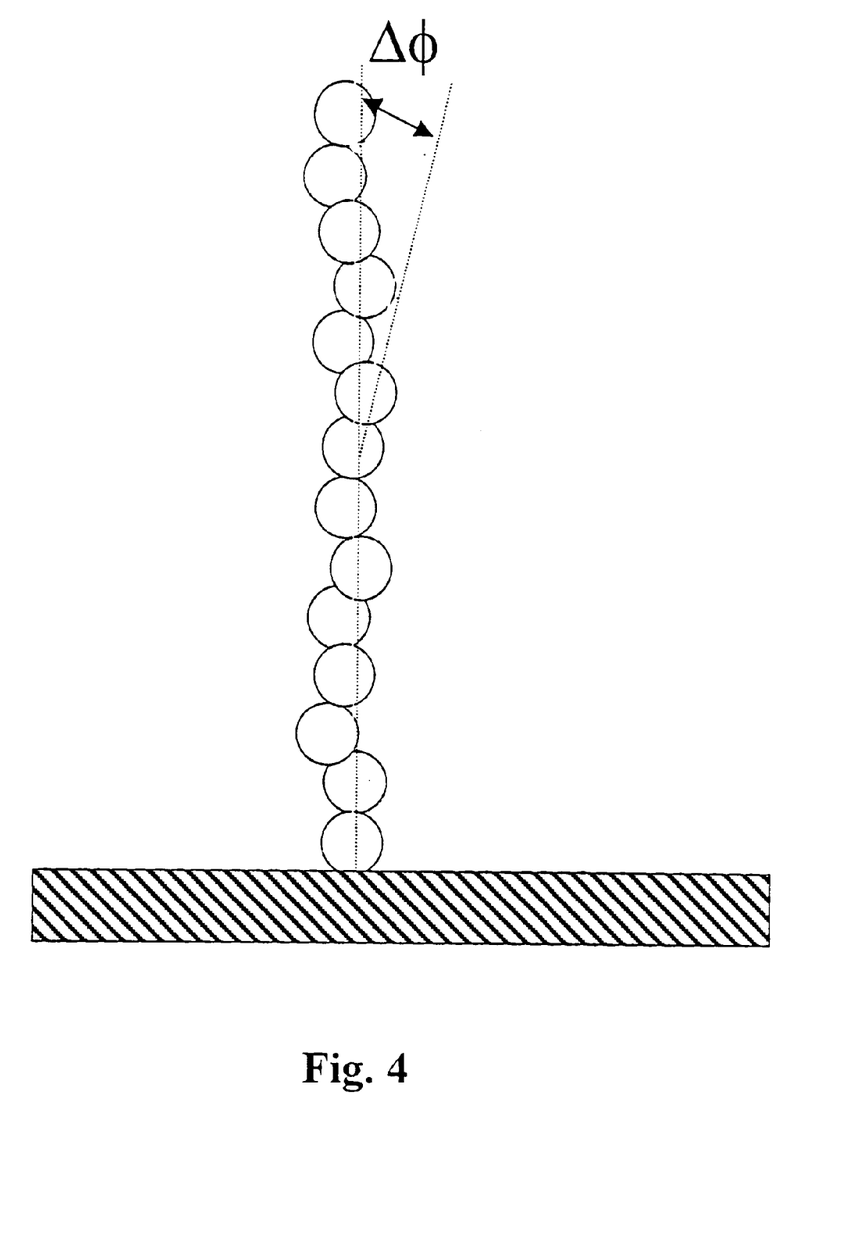
FIG. 4 is a schematic representation of a column structure of polymer-blend particle stack showing the polar angle $\Delta\phi$ which refers to the angle formed between particle centers relative to the z-axis.

The particle binding is so robust that single particles were able to be "stacked" on top of each other to form nearly perfect columnar structures. FIG. 4 is a schematic representation of column structure of polymer-blend particle stack. The polar angle, $\Delta\phi$, refers to the angle formed between particle centers relative to the z-axis. In this case, the monomer diameter was 6.5 $\mu$m and the height of the stack, measured by z translation of the microscope stage to bring the top particle in focus, was 124 ±2 $\mu$m. From the SEM measurements, a value of 6.37 $\mu$m for the effective monomer length ($d_{eff}$) between particles in the chain was obtained, which can be used to estimate the average polar angle fluctuations ($\Delta\phi$) between particles from $(\Delta\phi) = \cos^{-1}((_{meas}/20)/d_{eff}) = 13.30°$. This corresponds to center position fluctuations relative to the axis of ±0.3 $\mu$m, which is well within expectations from Brownian noise. This indicates that there is negligible electrostatic deflection of the incoming particle by the top particle in the stack.

The issue of carrier mobility on the surface of the particle and polarizability of these species remains an important question related to artificial atom synthesis from charged polymer nanoparticles. In the example of the present invention, the nominal charge per particle is about 100 carriers/particle. Depending on the carrier mobility on the surface of the particle, the charge distribution may become polarized as one particle approaches another.

Surface interpenetration and particle chain formation result from a competition between two factors: as the particles come into contact, polymer interchain interactions near the surface drive the merging process in order to minimize surface free energy. However, the particles are restricted from merging completely by the energy cost of reorganizing the spherical matrix. In the dry state (particles formed under very low relative humidity conditions), polymer chain entanglement reduces further the mobility required to merge the surfaces together. With the commercial silanated slides used in the above example, pure PEG particles-which retain significantly more water than PVA-wet the silanated glass substrate significantly even under fairly low relative humidity conditions (<40%). In this case, the particles appeared as filmlike "pancake" structures and 3 D attachment was not observed. Particles of pure PVA retain a smaller volume fraction of water with correspondingly lower polymer mobility, giving rise to a more rigid matrix, chain entanglement, and higher surface free energy which inhibits particle attachment. In the blend system of the present invention, the composite properties allow the particle surfaces to merge without sacrificing the structural integrity of the individual particle. However, some residual solvent is required (volume threshold appears to be about 5%) in the attachment process to reduce chain entanglement and enhance mobility.

Often called "photonic atoms," dielectric microspheres are so named because of the "bound" photon states (quasinormal modes) associated with the spherically symmetric "potential" of the refractive index discontinuity at the particle surface. Recently, new techniques for isolating and manipulating spheres closely matched in size has revealed photonic molecule modes resulting from coherent coupling of optical resonances between physisorbed spheres. However, trisphere (or longer chain) systems have not been investigated for such behavior.

One of the surprising aspects of the present invention was the observation of sharp resonance features (distinct from "monomer" resonances) in fluorescence from dye doped into the particles. In previous work by Videen and co-workers, the optical properties of merged-sphere systems were considered. Resonance features in emission were also observed in transient merging-droplet experiments by Moon, et al. What is surprising about the observation of shared optical resonances from merged spheres (especially with the large solid angle of intersection) is that a large segment of the dielectric boundary, which confines the electromagnetic wave, has been removed. Geometric optics calculations of long-lived trajectories in merged spheres show clearly that high-Q resonances are not supported for (plane) angles of intersection exceeding more than a few degrees. Calculations on bisphere of differing sizes have shown interesting antinodal structure that includes an interaction between states with significantly different angular momenta, but with very low Q. Only in the special case where the contact angle is very small, similar to the physisorbed sphere case, are high-Q coupled resonances in the equatorial plane supported.

Figure 5A:
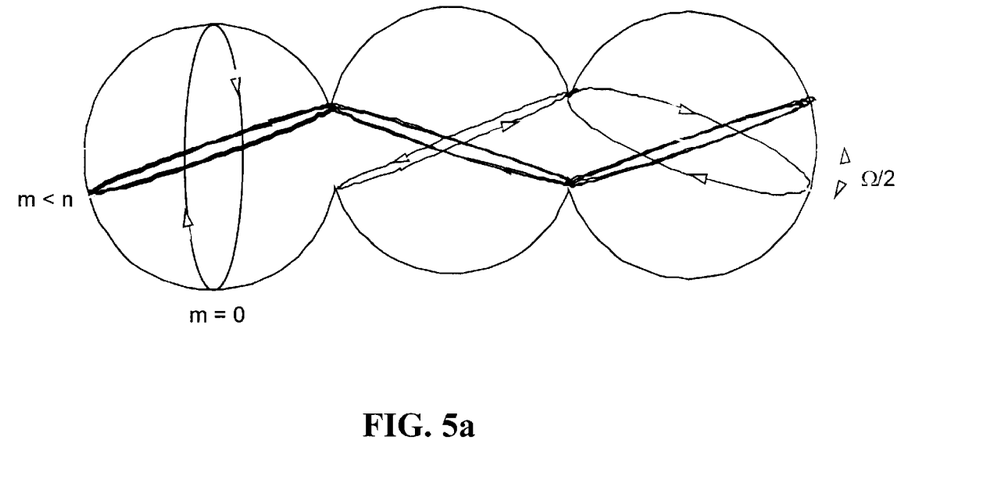
FIG. 5a is a schematic of a ray path through a photonic molecule mode.
Figure 5B:
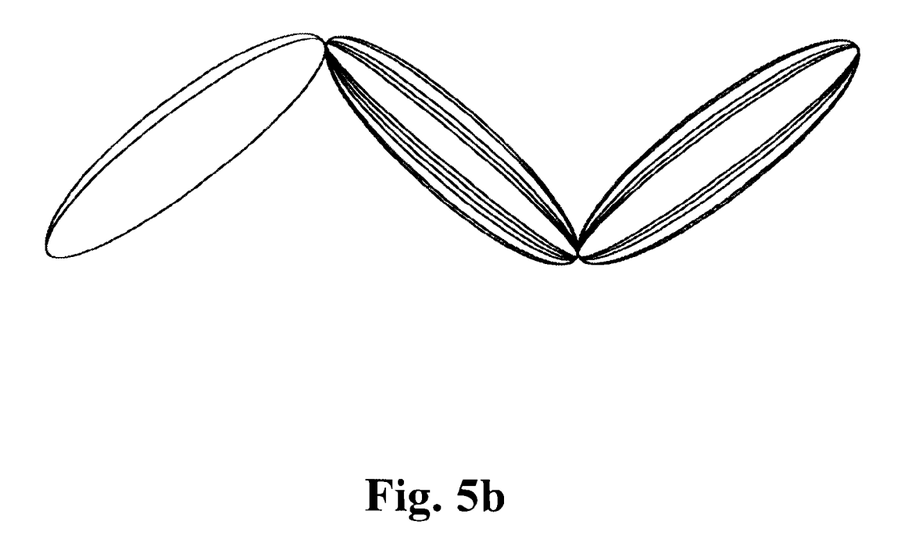
FIG. 5b is a schematic of a 3-D periodic trajectory in a linear trisphere.

In the Example of the present invention, typical plane angles of intersection can be more than 50 degrees, yet the structures clearly support high-Q resonances. Using a combination of three-dimensional ray optics and surface-of-section techniques, robust periodic trajectories that make a quasi-helical path around the particle chain axis were found. FIG. 5a shows a schematic of a photonic molecule mode for a trisphere system with an angle of intersection similar to that made in the above Example 1, and an example of a long-lived periodic trajectory that couples three merged spheres with a solid angle of intersection of ~0.3 sr (plane angle of 40°). These coupled resonances appear to be highly robust with respect to overlap angle, deviations from collinearity, and size along the chain axis. The classical path shown in FIG. 5b could be interpreted as connecting azimuthal modes of the same index ($0<m<n$, $n \approx X = \Pi d/\lambda$) with opposite sign.

These structures are capable of manipulation of optical waves in a wide variety of 2- and 3-dimensional photonic wire structures that can be tailored to a particular application. A number of interesting applications of these structures are possible, including 3-D conductive vertical wires/supports, and sensor technologies. By tuning the particle intersection (via adjustment of polymer blend composition), the coupling between orthogonal particle chain segments where the bend radius is close to the particle radius (e.g. 1 to 4 $\mu$m) can be turned on or off. Losses should be comparable to single- (linear) chain coupling which has already shown to be low.

Depending on the operation, the water-based polymer blend microparticle system of the present invention can be linked by several hundred individual particles sequentially linked to form complex three-dimensional structures, or highly ordered two-dimensional arrays of 3 D columns can be produced with 2 D spacing as small as 30 $\mu$m. Some interesting possible applications of these columnar structures include doping the polymer particles with electrolytes to form conductive vertical wires that could interconnect various planar structures. Recent molecular dynamics simulations also suggest that the whisker structures have vibrational modes (or respond to low-frequency oscillating electric or magnetic fields) characteristic of the height of the stack and the diameter of the monomer particle which could lead to a new kind of acoustic sensor.

While there has been shown and described what are at present considered the preferred embodiments of the invention, it will be obvious to those skilled in the art that various changes and modifications can be made therein without departing from the scope of the invention defined by the appended claims.

What is claimed is:

1. A photonic polymer-blend structure comprising monomer units of spherical microparticles of a polymer-blend material, said spherical microparticles having surfaces partially merged with one another in a robust inter-particle bond having a tunable inter-particle separation, said polymer-blend spherical microparticles sequentially attached to one another in a desired and programmable architecture, said photonic polymer-blend structure having tunable optical and mechanical properties.

2. The structure of claim 1 wherein said polymer-blend spherical microparticles are homogeneous having diameters ranging from 1–10 $\mu$m.

3. The structure of claim 1 wherein said inter-particle separation is tunable by adjusting the relative mass fraction of said polymer-blend material.

4. The structure of claim 1 wherein said optical properties include the frequency of light propagated through said spherical microparticles tunable by controlling the size and morphology of said spherical microparticles and by controlling the relative mass fraction of said polymer-blend material.

5. The structure of claim 1 wherein said optical properties include the spatial control of light propagation through said spherical microparticles tunable by controlling said architecture of said structure and by controlling said inter-particle separation.

6. The structure of claim 1 wherein said architecture of said structure is two-dimensional.

7. The structure of claim 1 wherein said architecture of said structure is three-dimensional.

8. The structure of claim 1 wherein said architecture of said structure is linear or columnar.

9. The structure of claim 7 wherein said structure is branched.

10. The structure of claim 1 wherein said spherical microparticles are doped with ionic species to form conductive wires.

11. A method for making photonic polmer-blend structures having tunable optical and mechanical properties comprising the steps of:

a) providing an aqueous polymer-blend solution comprising a relative mass fraction of polyethylene glycol and polyvinyl alcohol wherein said solution having a sufficient water and polymer blend ratio to form polymer-blend spherical microparticles having specific properties and morphology to enable said microparticles to partially merge in a sequential attachment with one another to form an inter-particle bond having an inter-particle separation wherein said specific properties and morphology of said microparticles tune said inter-particle separation and wherein said specific properties and morphology of said spherical microparticles produce a desired photonic polymer-blend structure having a desired architecture;

b) injecting said aqueous polymer-blend solution into a particle focusing device at a sufficient rate so to form individual droplets of solution;

c) controlling said parameters of said particle focusing device to allow said droplets to be spatially focused and guided through said particle focusing device to form spherical microparticles partially merged in a sequential attachment in an inter-particle bond with one another and having a tuned inter-particle separation; and d) depositing said spherical microparticles in a precise placement on a collection device forming a desired architecture of said photonic polymer-blend structure.

12. The method of claim 11 wherein said polyethylene glycol and said polyvinyl alcohol is in a 4:1 mass ratio.

13. The method of claim 11 wherein homogeneous polymer-blend spherical microparticles are formed having diameters ranging from 1–10 $\mu$m.

14. The method of claim 11 wherein said inter-particle separation is tuned by adjusting said relative mass fraction of said polymer-blend material.

15. The method of claim 11 wherein said aqueous polymer-blend solution further comprises an ionic species.

16. The method of claim 11 wherein said particle focusing device is an electric quadrupole.

* * * * *